3,030,385
4,4-DIHALOTETRAHYDROPYRANS
Erich Marcus and John T. Fitzpatrick, Charleston, W. Va., assignors to Union Carbide Corporation, a corporation of New York
No Drawing. Filed Dec. 16, 1959, Ser. No. 859,859
3 Claims. (Cl. 260—345.1)

This invention relates to dihalotetrahydropyrans which are useful as plasticizers for vinyl halide resins, and as intermediates in the preparation of tetrahydropyrones. In a particular aspect, this invention relates to a novel process for producing 4,4-dihalotetrahydropyrans from the reaction of aliphatic allenes with alpha-haloalkyl ethers.

It has been discovered that a valuable class of 4,4-dihalotetrahydropyrans corresponding to the formula

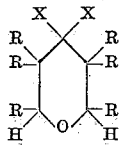

can be produced by a process which comprises reacting together an allene corresponding to the formula

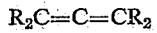

with an aliphatic ether corresponding to the formula

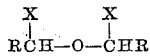

at a temperature between 10° C. and 100° C. in the presence of a Friedel-Crafts catalyst, wherein R is a member selected from the group consisting of hydrogen and alkyl radicals containing between one and eight carbon atoms and X is a halogen atom.

Illustrative of suitable alkyl radicals corresponding to R are methyl, ethyl, propyl, butyl, isobutyl, pentyl, isopentyl, hexyl, isohexyl, heptyl, octyl, isooctyl, and the like. The halogen atoms represented by X are chlorine, bromine and iodine.

Among the aliphatic alpha-haloethers which can be employed in the instant process are bis(chloromethyl) ether; bis(bromomethyl) ether; bis(alpha-chloroethyl) ether; bis(alpha-bromoethyl) ether; bis(alpha-chlorobutyl) ether; bis(alpha-bromoisopropyl) ether; chloromethyl alpha-chloroethyl ether; bis(alpha-bromooctyl) ether; bis(iodomethyl) ether; bis(alpha-iodoethyl) ether, and the like.

Among the aliphatic allenes which can be employed in the instant process are allene; 1,2-butadiene; 3-methyl-1,2-butadiene; 1,2-pentadiene; 2,3-pentadiene; 1,2-hexadiene; 2,3-hexadiene; tert.-butylallene; tetramethylallene; and the like.

4,4-dihalotetrahydropyrans which are particularly amenable for production by the instant invention process are those compounds corresponding to the above general formula in which R is a hydrogen or methyl radical and X is a chlorine or bromine atom. Illustrative of these compounds are 4,4-dichlorotetrahydropyran;
4,4-dibromotetrahydropyran;
4,4-dichloro-2,6-dimethyltetrahydropyran;
4,4-dibromo-2,6-dimethyltetrahydropyran;
4,4-dichloro-3,5-dimethyltetrahydropyran;
4,4-dibromo-3,5-dimethyltetrahydropyran;
4,4-dichloro-3,3,5,5-tetramethyltetrahydropyran;
4,4-dibromo-3,3,5,5-tetramethyltetrahydropyran;
4,4-dichloro-2,3,5,6-tetramethyltetrahydropyran;
4,4-dibromo-2,3,5,6-tetramethyltetrahydropyran;

and the like.

The invention process is catalyzed by catalysts of the type employed in Friedel-Crafts reactions. Illustrative of the "Friedel-Crafts catalysts" are Lewis acid metal halides such as aluminum chloride, zinc chloride, titanium tetrachloride, stannic chloride, zinc bromide, stannic bromide, and the like, and Lewis acid boron halides such as boron trifluoride. By "Lewis acid" is meant compounds which are electron-acceptors. In certain cases it may be desirable to employ mineral acids such as hydrogen fluoride, sulfuric acid and phosphoric acid to catalyze the reaction.

The catalyst is employed in a quantity sufficient to catalyze the reaction at a practical rate. The quantity of catalyst and the reaction time required by the process vary depending on the nature of the reactants and the reaction temperature. The quantity of catalyst can vary between about 1 weight percent and 25 weight percent, based on the weight of aliphatic alpha-haloether. Preferably, the catalyst is employed in a quantity between 5 and 10 weight percent, based on the weight of aliphatic alpha-haloether. The reaction time can vary between about 0.5 hour and 10 hours. In general, a reaction time between four hours and eight hours is sufficient to complete the reaction.

The aliphatic allene and aliphatic alpha-haloether can be employed in a molar ratio which varies between about 10:1 and 1:10 moles of aliphatic allene to moles of aliphatic alpha-haloether. Generally, it is preferred to employ a molar excess of aliphatic allene, e.g., between about 1 mole and 5 moles of aliphatic allene per mole of aliphatic alpha-haloether.

In a particularly preferred mode of conducting the invention process the aliphatic alpha-haloether is added slowly to the aliphatic allene which is contained in the reaction zone under reaction conditions. The rate of addition of the aliphatic alpha-haloether is a determining factor in the final overall reaction time. The addition period for the aliphatic alpha-haloether can vary between two hours and six hours. The faster rates of addition can be employed when a large molar excess of aliphatic allene is being used, i.e., when the total moles of reactants in the process are in a ratio between about 2 moles and about 10 moles of aliphatic allene for each mole of aliphatic alpha-haloether. The quantity of aliphatic allene employed in excess need only be limited by practical considerations.

The reaction of the aliphatic allene with the aliphatic alpha-haloether to produce 4,4-dihalotetrahydropyrans proceeds on a mole-to-mole basis. Hence, the process can be conducted employing equimolar quantities of reactants. However, it is preferred that the aliphatic allene be present in a molar excess in the reaction zone during the reaction period. As mentioned previously, this is preferably accomplished by the slow addition of the aliphatic alpha-haloether to the total quantity of aliphatic allene in the reaction zone. Alternatively, the total moles of reactants can be mixed and reacted directly if a several-fold molar excess of aliphatic allene is employed.

The use of a polymerization inhibitor such as hydroquinone is advantageous and provides higher yields and cleaner products by preventing polymerization of the aliphatic diene component. If desired, inert solvents can be employed as a reaction medium, e.g., acetic acid, tetrahydrofuran, hexane, and the like.

The 4,4-dihalotetrahydropyran product can be recovered from the process reaction mixture by fractional distillation. If desired, the 4,4-dihalotetrahydropyran product can be submitted to further chemical transformation conditions in crude form without separation from the reaction mixture. For example, a crude 4,4-dihalotetrahydropyran product can be converted into the corresponding 4-tetrahydropyrone by treating the crude product mixture under hydrolysis conditions.

The following examples will serve to illustrate specific embodiments of the invention.

Example 1

This example illustrates the preparation of 4,4-dichlorotetrahydropyran.

A mixture of 79 grams (1.97 moles) of allene, 8 grams of freshly fused and pulverized zinc chloride, and 0.5 gram of hydroquinone was heated in a one-liter bomb to a temperature of 41° C. While the temperature was maintained between 41° C. and 45° C., 297 grams (2.58 moles) of bis(chloromethyl)ether was pumped slowly into the bomb over a period of 2¼ hours. After the addition period was completed, the reaction mixture was heated for another six hours. The reaction mixture was removed from the bomb and unchanged bis(chloromethyl) ether was removed by distillation. 4,4-dichlorotetrahydropyran (83 grams, 27 percent yield based on allene) was obtained as a colorless liquid, boiling point 45° C., 3 millimeters of mercury—50° C., 5 millimeters of mercury, $n_D^{30}$ 1.4716. An analytical sample was prepared by redistillation of the product, boiling point 48° C. to 50° C., 5 millimeters of mercury, $n_D^{20}$ 1.4766, $d^{20}$ 1.280.

*Analysis.*—Calc. for $C_5H_8Cl_2O$: C, 38.71; H, 5.21; Cl, 45.81; $M_D$ 34.46. Found: C, 38.77; H, 5.16; Cl, 45.16; $M_D$ 34.18.

Infrared, nuclear magnetic resonance and mass spectral data were consistent with the product structure.

Under similar conditions, bis(chloromethyl) ether (575 grams, 5 moles) was added slowly to allene (610 grams, 15.2 moles) in the presence of stannic chloride catalyst (20 grams). 4,4-dichlorotetrahydropyran was obtained in 40 percent yield, based on the weight of bis(chloromethyl) ether.

Example 2

This example illustrates the preparation of 4,4-dibromotetrahydropyran.

During a period of two hours, 45 grams (1.12 moles) of allene were added with stirring to a mixture of 204 grams (1 mole) of bis(bromomethyl) ether, 6 grams of zinc bromide, and 0.3 gram of hydroquinone, which was maintained at a temperature between 38° C. and 43° C. After the addition period was completed, the heating was continued for an additional hour. The product mixture was washed with water and submitted to fractional distillation. Crude 4,4-dibromotetrahydropyran (70 grams) was obtained. An analytical sample was prepared by redistillation, boiling point 38° C., 0.5 millimeter of mercury, $d^{20}$ 1.916, $n_D^{20}$ 1.5447.

*Analysis.*—Calc. for $C_5H_8Br_2O$: C, 24.62; H, 3.30; $M_D$ 40.26; M.W., 244. Found: C, 24.60; H, 3.32; $M_D$ 40.24; M.W., 244 (mass spectrometer).

In the same manner as above, 4,4-dibromo-3,3,5,5-tetramethyltetrahydropyran is prepared by adding 1.12 moles of tetramethylallene to a mixture of 1 mole of bis(bromomethyl) ether in the presence of 6 grams zinc bromide catalyst, and hydroquinone inhibitor. The product is isolated by fractional distillation.

What is claimed is:

1. A method for producing 4,4-dihalotetrahydropyrans of the formula

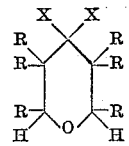

which comprises reacting together an allene of the formula $$R_2C=C=CR_2$$

with an aliphatic ether of the formula

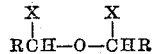

at a temperature between 10° C. and 100° C. in the presence of a Friedel-Crafts catalyst, wherein R is a member selected from the group consisting of hydrogen and alkyl having between one and eight carbon atoms and X is a member selected from the group consisting of chlorine and bromine.

2. A process for producing 4,4-dichlorotetrahydropyran which comprises reacting bis(chloromethyl) ether with a molar excess of allene at a temperature between 35° C. and 75° C. in the presence of a catalytic quantity of a Friedel-Crafts catalyst.

3. A process for producing 4,4-dibromotetrahydropyran which comprises reacting bis(bromomethyl) ether with a molar excess of allene at a temperature between 40° C. and 75° C. in the presence of a catalytic quantity of a Friedel-Crafts catalyst.

References Cited in the file of this patent

Colonge et al.: Chemical Abstracts, vol. 51, page 1157 (1951).

Riobe: Chemical Abstracts, vol. 50, page 4931 (1956).